Patented Oct. 25, 1927.

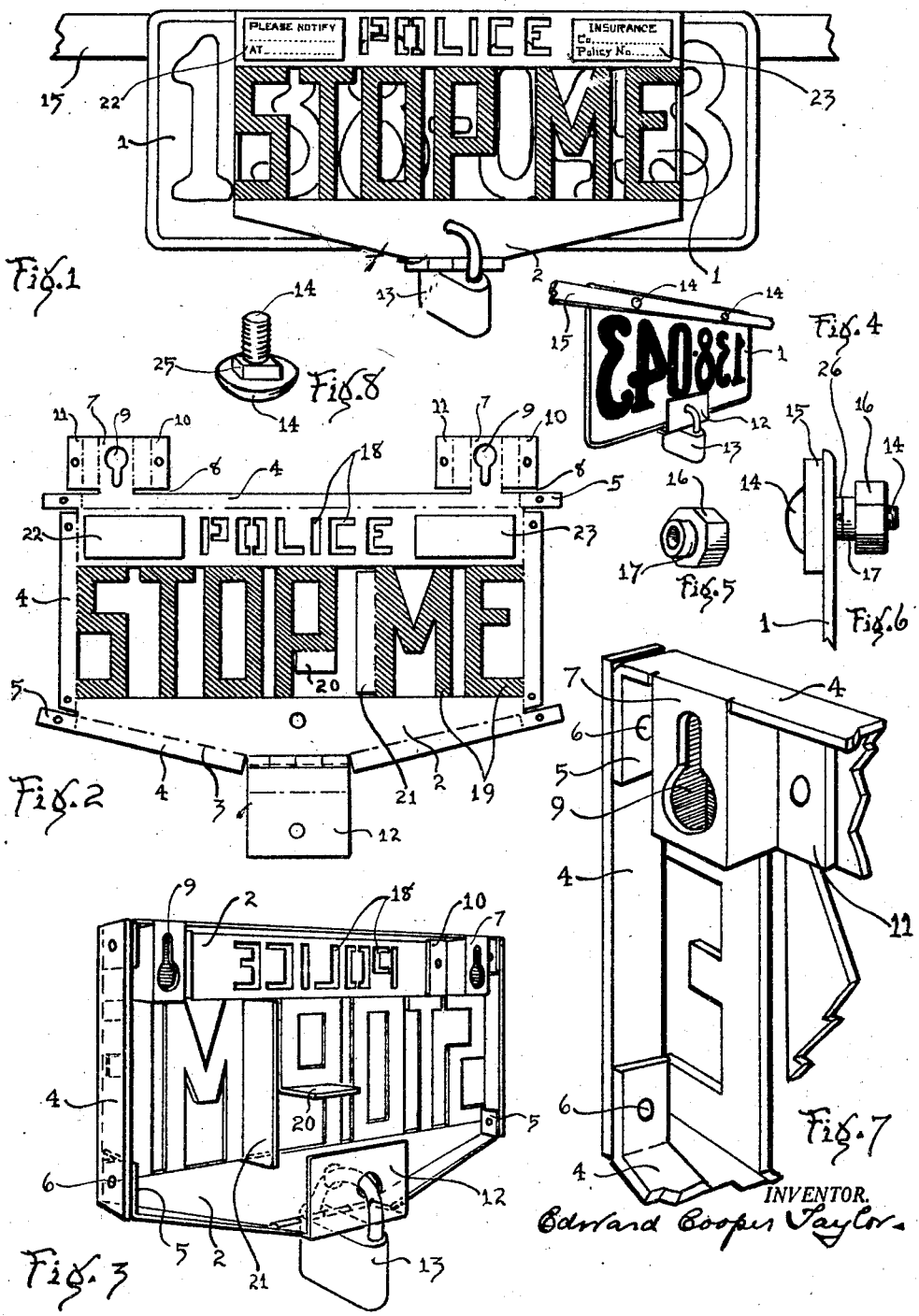

1,646,886

UNITED STATES PATENT OFFICE.

EDWARD COOPER TAYLOR, OF NEW YORK, N. Y.

STOLEN-CAR SIGNAL.

Application filed July 9, 1924. Serial No. 725,013.

My invention is an improvement in stolen car signals, and with respect to its more specific features in signals for temporary attachment to motor cars.

Numerous methods and mechanisms designed to prevent or to discourage motor car thefts have been proposed, none of which has heretofore been entirely satisfactory. Such methods and mechanisms are usually in the nature of impediments to the handling of the controlling devices of the car, or to the movement of the car itself, or they are in the nature of warning signals, audible or visible, designed to advertise that the car is in the hands of unauthorized parties.

Those which lock the controlling devices of the car, do not as a rule, preclude towing, and those which lock the car itself, are usually expensive, troublesome to apply and to remove. Any device which advertises itself to the presumptive thief, may act as a deterrent to the theft, and it may act as a stimulant to his wits in finding a method of circumvention.

An object of the present invention is to provide a device of the class described, of a simple nature, which when in place will advertise unauthorized use of the car, and which can not be removed without causing noticeable damage, not to the car itself, but to one of its most important and most noticeable accessories, the license plate.

Another object is to provide a device which may be cheaply constructed, sold at a low price, and which may be applied and removed with a minimum of trouble, and without the use of tools.

With these and other objects in view, the invention consists in the construction and novel combination of parts fully described hereinafter; illustrated in the accompanying drawings, and pointed out in the claims appended hereto, it being understood that various changes in the form, proportion, size and minor details of construction, within the scope of the claims, may be resorted to without departing from the spirit of the invention.

In the drawings forming a part hereof;

Figure 1 is a front view of the improved car stolen signal, in place on the license plate, and looking at the rear of the car.

Figure 2 is a plan view of the blank from which the signal is formed.

Figure 3 is a perspective view of the signal from the rear.

Figure 4 is a rear view of the license plate with the signal in place.

Figure 5 is a perspective view of the nut.

Figure 6 is a detail, in side elevation, of the bolt and nut in place.

Figure 7 is a perspective view of a part of the signal, showing the boxing for the keyhole slots.

Figure 8 is a perspective view of the license plate connecting bolt.

In the present embodiment of the invention, the signal is a plate of suitable dimensions, and of sheet metal, of a size to cover or partially cover the license plate 1 of a car, and preferably the signal plate 2 is provided with distinctive markings, indicating unauthorized use of the car, although it is obvious that the covering of the license plate to obscure the data thereon would be in itself an efficient method of attracting attention to the fact that conditions were not normal with respect to the car.

The blank from which the signal or sign is formed is cut or otherwise brought to the desired outline, and by means of crease lines 3, or otherwise, flanges 4 are outlined, which are afterwards bent at a right angle to the blank, as shown in Figure 3, so that when the sign is in place, it forms with the license plate a box, enclosing the supporting means for the sign, to be later described. The ends of each side flange 4 are separated from the blank to form tabs 5, which are bent to lap upon the adjacent ends of the end flanges, and the tabs are riveted or otherwise secured to the end flanges, as indicated at 6.

Other tabs 7 are provided at each end of the upper side edge of the blank, and the ends of each tab are separated from the body of the blank, as shown at 8. A keyhole slot 9 is cut in the central or attached portion of each tab, and the ends of the tabs are creased to outline two portions 10 and 11. The ends of the tabs are then so bent, that the portions 11 are substantially parallel with the central or body portion. When the flange 4 at this side edge is bent at right angles to the body of the blank, the tabs are bent ninety degrees further, so that the portions 11 thereof abut the face of the blank body and lie flat thereon. The portions 11 are riveted or otherwise secured to the blank body, and the tabs form boxes with the flange, enclosing the key-hole slots.

The lower edge of the blank is shaped to form two portions meeting at an obtuse angle, and the central portion of the flange is constituted by a hasp 12 hinged to the blank, and having an angular extension as shown, to lap upon the face of the license plate remote from the sign.

The lapping portion of the hasp, the body of the sign, and the license plate have openings, registering when the sign is in place, to receive the shackle of a padlock 13, thereby to lock the sign to the plate, it being understood that other means is provided, cooperating with the keyhole slots 9, to support the sign from the plate. The said means in the present instance, is constituted by the means which connects the license plate to the car.

The connecting means for the license plate is usually bolts 14, which pass through registering openings in a bar 15 forming a part of the car, and the bolts are engaged by nuts 16, to secure the parts together. In the present instance the nuts 16 are of special construction, each having a reduced portion 17 next the license plate. The reduced portions of the nuts are of a size to fit within the narrow portions of the key hole slots, while the bodies of the nuts will pass through the wide portions.

When the car is parked, the signal is attached to the license plate, by engaging the keyhole slots with the nuts. The hasp is then turned back to bring the openings in the plate, signal and hasp into register, and the shackle of the padlock is inserted. It will be noticed that the hasp is of relatively large area, to cover a relatively large portion of the back of the license plate, Figure 4. This is with intention, to prevent or discourage cutting out of lock, and to leave a noticeable disfiguration of the license plate, if done.

Preferably, the signal is provided with distinctive markings, advertising the unauthorized use of the car, and the markings are of such nature that they assist in making the data on the license plate decipherable. In the present instance, the markings are formed by cutouts in the body of the blank, the cutouts cooperating to provide warning legends, indicated at 18 and 19. The cutouts are in the shape of letters, and the letters form the legends, "Police" and "Stop me", though it is obvious that any other legend or legends might be used.

In order to brace and reinforce the box formed by the signal and license plate, portions of the material from the cutouts, indicated at 20 and 21, and preferably near the center of the signal, are bent at a right angle to the body of the blank, and in the same direction as the flanges 4, the said portions being of a width such that when the sign is in place they will contact at their free edges with the plate. The cutouts are of sufficient aggregate area, and so arranged that the data on the license plate is decipherable through them, and at the ends of the sign, which is of less length than the plate.

Small plates 22 and 23 of softer material than that of the signal, may be riveted or otherwise secured to the signal at the upper corners, or elsewhere, on which may be stamped or otherwise formed data concerning the ownership of the car, and concerning the insurance, or any other data desired. This data will vary of course with the individual signals, but the signal otherwise is a stock article of manufacture, with dimensions based on the size of the license plate. The stamping of the data on the plates 22 and 23 may be done when the signals are sold.

The covering sign not only has means to engage the plate to support the sign, but it has also means to prevent disconnection of the plate from the car, which is a feature of importance, since it prevents substitution of other plates, to enable discarding of the sign. The sign boxes in the nuts, so that access to them for turning cannot be had, and means is provided to prevent turning out of the bolts, from the rear of the plate.

The said means is in the form of squared portions 25, adjacent to the bolt heads, which portions engage in the usual slots in the bar 15. The portions 25 may be of any desired polygonal contour, and the openings or slots of the bar similarly shaped. The portions 25 engage within the openings of the bar, and prevent turning of the bolt by means of mechanism engaging the head. A lock washer 26 is preferably arranged between the nut and the bolt. This washer may be of the same diameter as the reduced portion of the nut, and it may serve as an engaging means for the keyhole slots. That is the washer may be of a thickness such that no reduction of the nut is necessary. It is also obvious that by backing off the nuts a trifle, the keyhole slots might be engaged directly with the bolts, dispensing thus with reduced portion and washer, the boxes serving as locks for the nuts.

The improved signal may be connected with the license plate, either at the front or back of the car, or a signal may be used with both plates, where two are used, if desired. The boxes, in addition to their function as boxes, serve as reinforcements for the signal, and as reinforcements to the box formed by the sign and plate.

What I claim as new is:

1. In motor cars, a sign for covering the license plate having distinctive markings indicating unauthorized use of the car, and means to lock the sign to the plate, including means between the sign and the plate, to support the sign superposed upon the plate.

2. In motor cars, a sign for covering the license plate having distinctive markings indicating unauthorized use of the car, and means to lock the sign to the plate, including means between the sign and the plate to support the sign superposed upon the plate, the sign forming with the plate a box enclosing the supporting means.

3. In motor cars, a covering sign for the license plate having distinctive markings indicating unauthorized use of the car, and means to lock the sign to the plate, the distinctive markings including cut outs through which the data on the plate is visible, a part of the material from the cutouts bent to form reinforcing ribs between the sign and plate.

4. In motor cars, a covering sign for the license plate having distinctive markings indicating unauthorized use of the car, and means to lock the sign to the plate, including means between the sign and plate for engaging the plate to support the sign, the sign having flanges forming with the plate a box enclosing the supporting means.

5. In motor cars, a covering sign for the license plate, to indicate unauthorized use of the car, means between the sign and plate, for engaging the plate to support the sign, the sign having flanges abutting the plate when the sign is in place and forming with the plate a box to enclose the supporting means, a portion of the flange hinged to the sign, to provide a hasp, said portion having an angular extension at the end remote from the sign, to lap upon the rear face of the plate, the sign, plate, and hasp having registering openings for the shackle and padlock.

6. In motor cars, a covering sign for the license plate having distinctive markings indicating unauthorized use of the car, and means to lock the sign to the plate, including means between the sign and plate to support the sign superposed on the plate, said means boxed when the sign is locked to the plate.

7. In motor cars, the combination with the license plate, of means to connect the plate to the car, including bolts, and nuts having reduced portions next the plate, a covering sign having keyhole slots to engage the reduced portions, and means to lock the plate and sign together.

8. In motor cars, the combination with the license plate, of means to connect the plate to the car, including bolts, and nuts having reduced portions next the plate, a covering sign having keyhole slots to engage the reduced portions said slots being boxed when the sign is in place, and means to lock the plate and sign together.

9. In motor cars, the combination with the license plate, of means to connect the plate to the car, including bolts, and nuts having reduced portions next the plate, a covering plate for the license plate having keyhole slots to engage the reduced portions, the plates forming together a box enclosing the nuts and slots.

10. In motor cars, the combination with the license plate, of a covering plate therefor, means at one edge of the plates to connect them together, and a lock at the other edge, said plates forming together a box enclosing the connecting means.

11. In motor cars, the combination with the license plate, of means to connect the plate to the car, including bolts, and nuts having reduced portions, a covering sign having keyhole slots to engage the reduced portions said slots being boxed when the sign is in place, and means to lock the plate and sign together.

12. In motor cars, the combination with the license plate, and the bar to which it is connected, of bolts to connect the parts, the bar and bolts having cooperating means to prevent turning of the bolts, nuts engaging the bolts, a covering sign having means to engage the bolts and to box the nuts, and means to lock the sign to the plate.

13. In motor cars, the combination with the license plate, and the means to connect it to the car, of a covering sign, means between the sign and plate to support the plate superposed upon the sign, the plate having means extending between the edges of the sign and plate to prevent access to the supporting means.

14. In motor cars, the combination with the license plate, and the means to connect it to the car, of a covering sign, means between the sign and plate to support the plate superposed upon the sign, the plate having means extending between the edges of the sign and plate to prevent access to the supporting means, and means to lock the sign to the plate.

15. In motor cars, a worded signal sign having distinctive markings indicating unauthorized use of the car, and having provisions for the display of ownership data and the like, and means to connect the signal to the car including non-turnable bolts, flanged nuts, and boxed slots to engage the flanges, and means to lock the signal to the car.

16. In motor cars, the combination with a license plate, and the means for connecting the plate to the car, of a covering sign having distinctive markings indicating unauthorized use of the car, and having means between the sign and the plate when the sign is in place engaging the plate supporting means to support the sign.

17. A sign having display means to call attention thereto, and through which the data on a license plate is readable, means to support the sign in front of the license plate, said means between the sign and plate.

18. A sign having display means to call attention thereto, and through which the data on a license plate is readable, means to support the sign in front of the license plate, said means between the sign and plate, the sign having means cooperating with the plate when the sign is in place to enclose or box the supporting means whereby to prevent access thereto from the edges of the plate.

19. In combination with the license plate of a motor car, a sign having distinctive markings indicating unauthorized use of the car, and means to connect the sign and license plate to the car, including non-turnable bolts extending through the plate, nuts engaging the bolts, and spacing means between the nuts and the plate of less diameter than the nuts, the sign having openings to receive the nuts, the openings having restricted portions to closely engage the spacing means.

In testimony whereof I affix my signature.

EDWARD COOPER TAYLOR.